United States Patent [19]

Boese et al.

[11] Patent Number: 5,039,991

[45] Date of Patent: Aug. 13, 1991

[54] PERTURBATION MODELING SYSTEM FOR USE IN PROCESSING DIRECTION-FINDING ANTENNA OUTPUTS

[75] Inventors: Otto A. Boese, Bellevue; Frederick J. Kecherson, Federal Way, both of Wash.

[73] Assignee: The Boeing Company, Seattle, Wash.

[21] Appl. No.: 524,138

[22] Filed: May 15, 1990

[51] Int. Cl.$^5$ ............................................. G01S 3/02
[52] U.S. Cl. .................................. 342/420; 342/169; 342/170
[58] Field of Search ............... 342/417, 420, 421, 432, 342/170, 173, 174, 159

[56] References Cited

U.S. PATENT DOCUMENTS

| | | |
|---|---|---|
| 2,003,933 | 6/1935 | Greig . |
| 2,419,946 | 5/1947 | Edwards et al. . |
| 2,437,695 | 3/1948 | Jansky . |
| 3,134,104 | 5/1964 | Murphree et al. . |
| 3,430,243 | 2/1969 | Evans . |
| 3,972,044 | 7/1976 | Alford ............................ 342/417 X |
| 4,109,250 | 8/1978 | Vachenauer et al. . |
| 4,305,077 | 12/1981 | Tsumura . |
| 4,754,282 | 6/1988 | Edelblute et al. ................. 342/417 |
| 4,926,186 | 5/1990 | Kelly et al. ..................... 342/417 X |
| 4,929,958 | 5/1990 | Hodel et al. .................... 342/432 X |
| 4,947,176 | 8/1990 | Inatsune et al. .................... 342/173 |

Primary Examiner—Thomas H. Tarcza
Assistant Examiner—Tod R. Swann
Attorney, Agent, or Firm—Christensen, O'Connor Johnson & Kindness

[57] ABSTRACT

A system is disclosed in which a direction-finding system (12) employed on an aircraft (20) receives RF transmissions from a remote signal source (16). Amplitude and phase data concerning the transmission are used for direction finding but are perturbed by the various surfaces of the aircraft. To minimize the influence of such perturbations, a database (14) including model data subject to the same perturbations is employed by the system and incoming transmissions from signal source (16) are correlated to the database data to determine the proper azimuth and elevation associated with said transmissions. Several embodiments of a database production system (18) used in creating the database are also disclosed.

12 Claims, 10 Drawing Sheets

 
Fig. 4.
 
 
Fig. 5.

PERTURBATION MODELING SYSTEM FOR USE IN PROCESSING DIRECTION-FINDING ANTENNA OUTPUTS

FIELD OF THE INVENTION

This invention relates generally to antennas and, more particularly, to systems for processing antenna outputs.

BACKGROUND OF THE INVENTION

Systems have been designed to receive radio frequency (RF) electromagnetic transmissions for a variety of purposes. One application of particular interest involves the receipt of RF transmissions by the system for use in direction finding (DF). In such DF applications, RF transmissions from a signal source are received by the antenna and processed by a receiver and processor for phase and amplitude signature recognition to determine the "direction" of the source.

For ground-based systems, the antenna is typically stationary and the directional information obtained is used to locate the signal source. In airborne-based applications, the antenna is carried by an aircraft and the directional information obtained may be used to locate the aircraft for navigation. In that regard, if the position of the signal source is fixed and known, DF operation of an airborne system can be used to determine the aircraft's position relative to the fixed signal source and, hence, the aircraft's location. Alternatively, if the aircraft's position is known, DF operation of system 12 can be used to locate the signal source.

One example of a system that employs direction finding is the communication intercept (COMINT) system, which receives RF transmissions in the form of communication signals to locate the signals' source. Another example of a system that may employ direction finding is the sonobuoy reference system (SRS), in which the signal sources used for direction finding are sonobuoys used to track submarines.

The most elemental form of DF system determines the azimuth of RF transmissions at the antenna system in a single horizontal plane. In addition to determining this azimuth information, the processing section of the antenna system can be constructed to determine the elevation of the received transmissions in a vertical plane. Range data can also be obtained by further processing of the received RF transmissions.

As previously suggested, systems employed for direction finding can be broadly classed as ground systems or airborne systems. Conventional ground systems employ three vertical dipole antenna elements. The amplitude and phase characteristics of transmissions from a signal source are correlated to stored data obtained from the same elements under known conditions during a calibration procedure. The bearing of a signal source is then determined from the stored data that most nearly correlates to the received data. The construction of such ground systems limits the environmental disruption of received transmissions, generically referred to as perturbation, and, when correlated to stored data, the phase and amplitude of the RF transmissions received by such a ground-based dipole system are relatively accurate.

Conventional airborne DF systems employ a relatively large number of antenna elements that are aligned on two axes of the aircraft and spaced, for example, one-half, three and one-half, five and one-half, nine and one-half, et cetera wavelengths apart. Signals received from relatively widely spaced elements are used to provide accurate phase difference information, while more proximate elements are used to resolve ambiguities.

As will be appreciated, the large number of antenna elements required by such airborne DF systems leaves a limited amount of space for other sensors on the aircraft's exterior. Thus, it would be desirable to employ a system having just a few antenna elements. DF systems employing fewer antenna elements have not been developed, however, because the aircraft's irregular surfaces and peripheral equipment, such as the wings, engines, and other protrusions, would perturb the received RF transmissions, making direction finding inaccurate.

Limited efforts have been made to study the performance of airborne antenna systems. One approach that has been used, however, involves a scaled model of the antenna that receives correspondingly scaled RF transmissions.

More particularly, the spacing of the elements in the antenna to be modeled is typically established as a function of the wavelength or frequency of the RF transmissions to be received. Thus, to allow the use of an antenna model that is physically smaller than the actual antenna, the RF transmissions used during modeling must have a frequency that is proportionally higher than the frequency of the transmissions to be received by the actual antenna. For example, if the model antenna is one-tenth the size of the actual antenna, the frequency of the RF transmissions used to evaluate the model's preformance must be ten times that of the RF transmissions to be received by the actual antenna.

Conventional modeling has, however, been employed as a tool used mainly to design antennas and antenna systems. For example, the model can be used to predict how a cockpit antenna will interfere with a radio antenna, allowing both antennas to be designed and spaced accordingly. Further, prior art antenna models for evaluating blade-type antennas have been primitive monopoles formed by a simple "stub" element, one-quarter wavelength long. These primitive models performed suitably over only a limited frequency band. Also, because such models did not physically model the actual antenna elements, they did not model the perturbations produced by the antenna elements. Thus, prior art arrangements have not been suitable to correct for the environmental perturbations experienced by airborne antenna elements.

In conclusion, it would be desirable to provide a DF system including a relatively small number of antenna elements that can be positioned in an environment in which RF transmission perturbations are likely to occur without such perturbations unduly influencing the DF capability of the system.

SUMMARY OF THE INVENTION

In accordance with this invention, a system is disclosed for receiving electromagnetic radiation, which may be subject to environmental perturbations, and producing a system output that is substantially unaffected by the perturbations. The system includes an antenna for producing an antenna output, in response to received electromagnetic radiation that may be affected by the perturbations. A data storage device is included for storing information relating to the effect of the perturbations on electromagnetic radiation received by the antenna. A processor receives the antenna output from the antenna and, with the information stored by the data storage device, produces the system output.

In accordance with a particular aspect of this invention, a direction-finding system positionable on an aircraft is disclosed for finding the direction of a source of incoming electromagnetic radiation. The aircraft perturbs the phase and amplitude of the electromagnetic radiation. The system includes an array of three antenna elements spaced by distances of no more than one-half the wavelength of the highest frequency of electromagnetic radiation. The array of antenna elements produces a plurality of antenna outputs in response to incoming electromagnetic radiation. The system further includes a correlation device for correlating the plurality of antenna outputs to representative data that is empirically derived at a plurality of scaled electromagnetic radiation frequencies and includes information about the azimuth and elevation angle of the scaled electromagnetic radiation and the perturbation of the aircraft.

BRIEF DESCRIPTION OF THE DRAWINGS

The invention will presently be described in greater detail, by way of example, with reference to the accompanying drawings, wherein:

FIGS. 4 and 5 illustrate alternative four-and five-element sets of antennas that can be used in the DF system;

DETAILED DESCRIPTION OF THE PREFERRED EMBODIMENT

Figure 1:
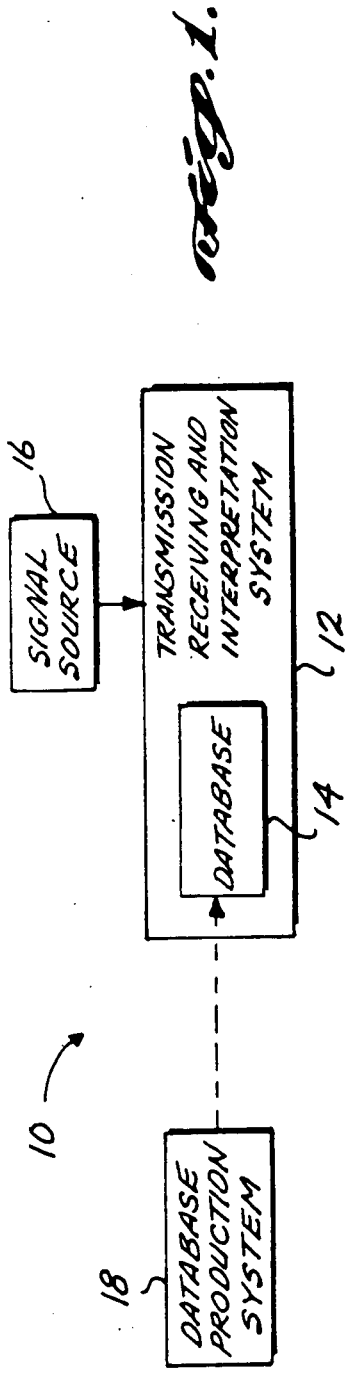
FIG. 1 is a block diagram of a system constructed in accordance with this invention including a database production system, a database, and a transmission receiving and interpretation system.

Referring now to FIG. 1, a system 10 is illustrated for use in receiving and accurately interpreting radio frequency (RF) transmissions. This system 10 includes a transmission receiving and interpretation system 12 that uses a database 14, which is stored, for example, by system 12, to properly interpret RF transmissions from a signal source 16. The database 14 includes information about the performance of the transmission receiving and interpretation system 12 under certain operating conditions, and is initially established by a database production system 18.

In the preferred embodiment, the transmission receiving and interpretation system 12 is a direction-finding (DF) system. The DF system 12 is preferably constructed for airborne use with relatively few antenna elements to determine the azimuth, elevation, and range of the signal source 16 with respect to DF system 12, without the environmental perturbations attributable to aircraft surfaces and equipment. In that regard, the database production system 18 models the performance of the DF system 12, including the effect of environmental perturbations, to produce a database 14 representative of the performance of system 12. The actual DF system 12 then uses the transmissions from signal source 16, along with the information in database 14, to perform direction finding substantially uninfluenced by the environmental perturbations.

Addressing the components of the comprehensive system 10 in greater detail, the signal source 16 that provides the basis for direction finding may be any one of a number of types. For example, the DF system 12 may be used in a communication-intercept (COMINT) type application in which the signal source 16 is, for example, an aircraft or ground emitter producing RF communication transmissions in the VHF through L bands of the electromagnetic frequency spectrum. In such an application, the DF system 12 may be constructed to determine the azimuth, elevation, and range of the signal source 16 relative to the DF system 12, but would require an independent navigational system to locate the relative ground position of either DF system 12 or signal source 16.

The signal source 16 may also be a sonobuoy whose location is unknown with respect to the DF system 12. DF system 12 may then be used in a sonobuoy reference system (SRS) -type application in which RF transmissions in the VHF frequency band are received for direction finding. As will be appreciated, by determining the azimuth and, if desired, elevation and range of the sonobuoy 16 with respect to DF system 12, the location of sonobuoy 16 can be determined.

Figure 2:
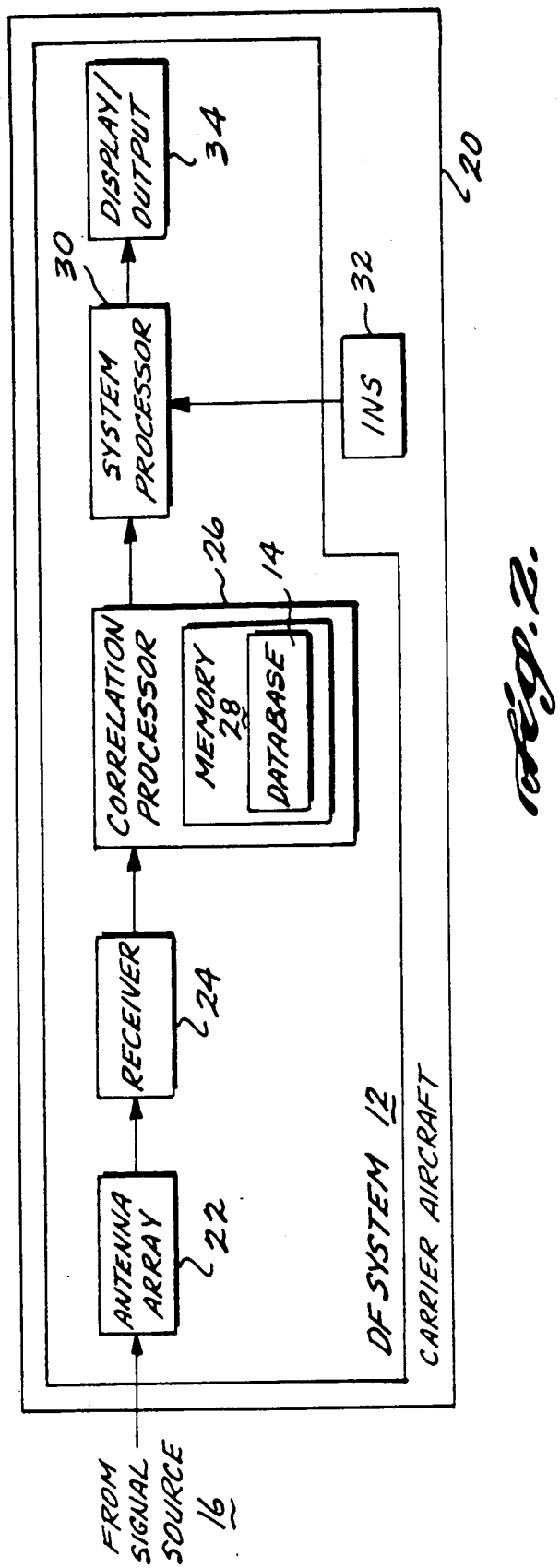
FIG. 2 is a more detailed block diagram of a direction finding (DF) embodiment of the transmission receiving and interpretation system of FIG. 1.

Having discussed several sources 16 of RF transmissions, the DF system 12 responsible for receiving and processing such transmissions will now be discussed in greater detail. As shown in FIG. 2, the DF system 12 is supported for airborne use by a carrier aircraft 20 and includes an antenna array 22, a receiver 24, a correlation processor 26 with memory 28, a system processor 30, an inertial navigation system (INS) 32, and a display or output 34.

Briefly reviewing the operation of these components, the antenna array 22 receives RF transmissions from signal source 16. These transmissions are perturbed, for example, by the irregular surfaces of aircraft 20 and by, for example, the aircraft's wings, engines, and body protrusions. Thus, the resultant RF electrical outputs of antenna array 22 and receiver 24 include amplitude and phase signatures that are influenced by the direction of signal source 16 as well as the environmental perturbations. Without correction, the DF system 12 would associate these outputs with RF transmissions received at a different azimuth and elevation.

To avoid that occurrence, the correlation processor 26 monitors the outputs of receiver 24 and correlates them to empirically derived model information in the database 14 stored in memory 28. More particularly, the database 14 associates a true source azimuth and elevation with a modeled output that is subject to correlative environmental perturbations. By correlating the measured output of antenna array 22 and receiver 24 with the information in database 14, the true azimuth and elevation of source 16, unaffected by the environmental perturbations, can thus be obtained.

The system processor 30 may further process the output of correlation processor 26 to determine, for example, the range of source 16 and may consult the inertial navigation system 32 to determine the location of aircraft 20 when, for example, the location of source 16 is not known. Although correlation processor 26 and system processor 30 are illustrated separately, as will be appreciated, their functions can be performed by a single processor. Finally, the display or output 34 provides an output representative of the desired directional information for human interpretation and analysis or for further system use.

Figure 3:
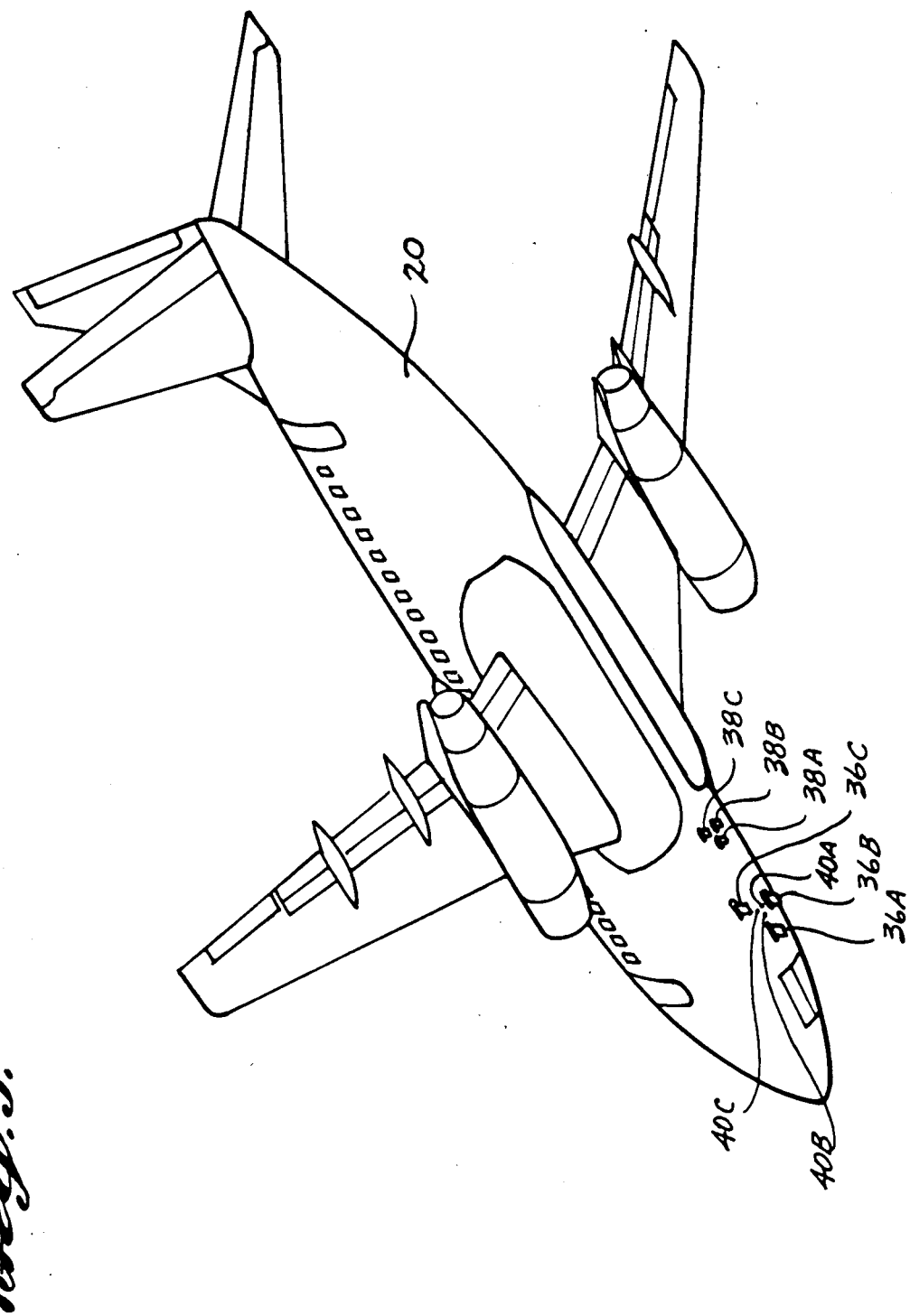
FIG. 3 is an illustration of an antenna array employed in the DF system of FIG. 2 and positioned on an aircraft, including three sets of three elements.

Addressing the various components of the DF system 12 individually, as shown in FIG. 3, the antenna array 22 preferably includes three sets 36, 38, and 40 of antenna elements. The first VHF set 36 includes three monopole or "blade" -type antenna elements 36A, 36B, and 36C arranged in a triangular configuration symmetrically about the centerline of aircraft 20, forward of its wings, as shown. This VHF set 36 of antenna elements responds to RF transmissions from source 16 in the VHF band (30 MHz to 110 MHz) by producing electrical outputs. The individual elements 36A, 36B, and 36C are spaced no farther apart than onehalf of the wavelength of the highest frequency RF transmission to be received.

The second VHF/UHF set 38 of antenna elements produces electrical outputs in response to RF transmissions from signal source 16 in the VHF/UHF frequency band of from approximately 110 MHz to 500 MHz. The three individual blade-type elements 38A, 38B, and 38C are also located in a triangular arrangement symmetrically about the centerline of aircraft 20, aft or forward of the VHF set 36 of antenna elements and preferably forward of the wings. The individual elements 38A, 38B, and 38C are also spaced no farther apart than one-half of the wavelength of the highest frequency RF transmissions to be received.

Finally, the third or L band set 40 of antenna elements responds to RF transmissions from the signal source 16 at frequencies extending from 500 MHz to 1400 MHz by producing electrical outputs of corresponding frequency. The three blade-type antenna elements 40A, 40B, and 40C are employed in a triangular configuration located inside, and symmetrical with, the VHF set 36 of elements.

As will be appreciated, a single one of the antenna element sets 36, 38, or 40 could be employed. With the three-set array 22, however, the DF system 12 can be designed to perform direction finding with COMINT and SRS signal sources 16. In addition to employing different sets 36, 38, or 40 of antenna elements, the number of elements in a given set can be varied. In that regard, although one advantage of the DF system 12 is its ability to perform direction finding with a limited number of antenna elements, more than three antenna elements can be employed if desired.

In that regard, four antenna elements (A, B, C, and D) can be used in a diamond configuration, as shown in FIG. 4, or a rectangular configuration. In addition, five antenna elements (A, B, C, D, and E) arranged in a pentagonal configuration, as shown in FIG. 5, can be used. The maximum spacing of adjacent elements is no greater than one-half the wavelength of the RF transmission having the highest expected frequency. By increasing the number of antenna elements, the accuracy of this system is enhanced. However, it has been determined that three antenna elements provide adequate directional accuracy, while conforming to most airframe shapes and leaving a maximum amount of airframe space available for other components.

Figure 6:
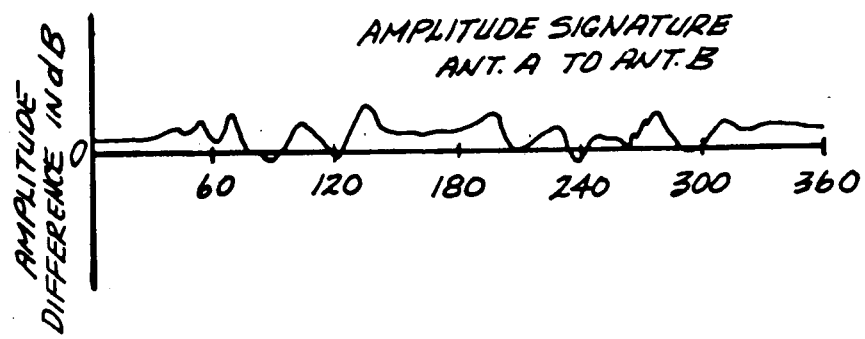
FIGS. 6 and 7 illustrate the amplitude and phase signature of an antenna whose output is perturbed by the exterior of the aircraft.
Figure 7:
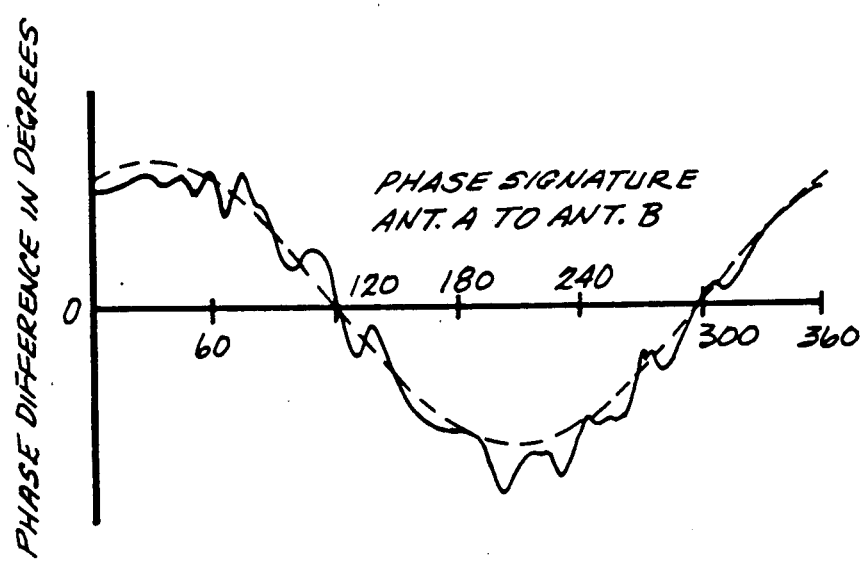

Addressing the next component of DF system 12, the receiver 24 must be suitable for receiving RF signals from the antenna array 22 over a broad portion of the electromagnetic frequency spectrum including the VHF, UHF, and L bands of that spectrum. The receiver 24 receives signals from sets 35, 38, and 40 of array 22 and provides coherency between the channels corresponding to the antenna elements, as required for downstream processing. As will be appreciated from FIGS. 6 and 7, the receiver output includes amplitude and phase signatures that are a function of, for example, the azimuth of signal source 16 and which are further subject to numerous variations introduced by the perturbation of aircraft 20 and adjacent antenna elements.

As will be appreciated, receiver 24 may be a single-channel device for receiving the outputs of individual elements sequentially, a three-channel device for receiving the outputs of all three elements of a given set 36, 38, or 40 simultaneously, or a nine-channel device for receiving the output of all three elements of all three sets simultaneously. A suitable embodiment of such a receiver 24 is the three-channel receiver offered by the Watkins-Johnson Company of California under Part No. W-J8617, each channel of which is identically matched. As will be described in greater detail below, the output of this receiver 24 is a set of complex voltages that include information about the amplitude an phase of the signals received at two of the elements normalized to a third element.

Addressing now the correlation processor 26, processor 26 is conventionally a microprocessor-based device that processes the complex voltages output by receiver 24 in accordance with programmed instructions stored in memory 28. In that regard, as will be described in greater detail below, correlation processor 26 first determines the antenna element set 36, 38, or 40 that is receiving the RF transmission and the frequency of the RF transmission received by system 12. This information is used to identify a segment of the database associated with that particular set and frequency. The complex voltages produced by receiver 24 are then correlated to complex voltages stored in the segment of the database 14, which have associated therewith empirically determined azimuths and elevations.

More particularly, processor 26 calculates correlation coefficients that relate each measured complex voltage to the most nearly correlative stored voltage. The azimuth and elevation associated with the stored voltage having the highest correlation coefficient can then be identified as the azimuth and elevation of the signal source 16. Because the database 14 contains a finite amount of data, however, some interpolation between the stored voltages is preferably performed to more closely establish the azimuth and elevation of the signal source 16. Thus, the correlation processor 26 further performs, for example, parabolic curve fitting of the correlation coefficients to interpolate more precisely the azimuth and elevation.

The system processor 30, like correlation processor 26, is preferably a microprocessor-based device with its own memory and interfaces. The system processor 30 may control a variety of aspects of the DF system including, for example, range determination in accordance with preprogrammed instructions discussed in greater detail below. Further, the system processor 30 may employ preprogrammed instructions to process information from the correlation processor 26 or inertial navigation system 32 to locate the position of aircraft 20.

Finally, the display/output 34 may be any of a variety of devices including, for example, a CRT in which the range and azimuth of the source 16 are shown in two dimensions. Alternatively, azimuth, elevation, and range may be given in digital format by displays or may be provided in printed form. Further, the display/output 34 may simply act as an interface to a more elaborate tracking and recording system for subsequent interpretation and analysis.

Addressing now the database 14 stored in the memory 28 of the correlation processor 26, as will be appreciated from the preceding discussion, database 14 preferably includes information about the amplitude and phase of signals received at the various antenna sets 36, 38, and 40 under a wide variety of known conditions. This information is stored as complex voltages, which are derived from a frequency-scaled model of the antenna array in one of several ways described in greater detail below. These complex voltages are subject to modeled environmental perturbations that closely correlate to the environmental perturbations experienced at the output of receiver 24. Thus, correlation between the complex voltages output by receiver 24 and the complex voltages and associated known azimuth and elevation information stored in the database 14 can be used to identify the true azimuth and elevation conditions associated with the transmissions received by antenna array 22.

Structurally, the database 14 is formed from a number of files, with data corresponding to each different antenna set 36, 38, and 40 maintained separately. Further, data for each of a plurality of discrete frequencies over the expected operating range of array 22 is maintained in separate subfiles. These discrete frequency files are further subdivided into a plurality of azimuth subfiles that are, in turn, divided by a plurality of elevation subfiles. In this manner, the azimuth and elevation of a received transmission can be sequentially identified by first identifying the antenna set and transmission frequency and then looking for the azimuth and elevation subfile containing the complex voltages that most nearly correlate to those produced by antenna array 22.

Figure 8:
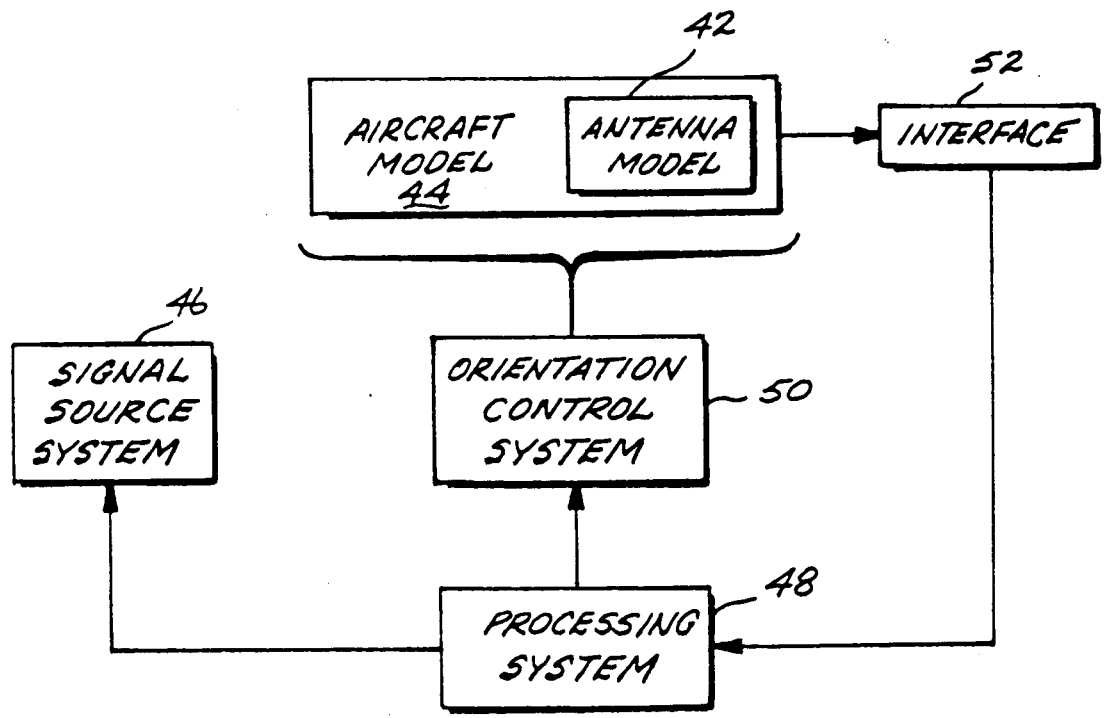
FIG. 8 is a more detailed block diagram of the database production system of FIG. 1.

To illustrate the organization of database 14 more fully, the database production system 18 will now be discussed in detail. In that regard, the system 18 is shown in FIG. 8. As shown, the database production system 18 includes an antenna model 42, aircraft model 44, signal source system 46, processing system 48, orientation control system 50, and interface 52.

Briefly reviewing the operation of these components, the frequency-scaled antenna model 42 and frequency-scaled aircraft model 44 are exposed to frequency-scaled RF transmissions from a signal source system 46, at known azimuths and elevations determined by orientation control system 50. The output of the antenna model 42 is then processed by processing system 48 to produce complex voltages that are a function of the RF transmissions received by antenna model 42, as influenced by the environmental perturbations of aircraft model 44. The processing system 48 stores these complex voltages in a field of database 14 associated with the known frequency, azimuth, and elevation.

Addressing the components of the database production system 18 in greater detail, although only one set is shown in FIG. 8, separate antenna models 42 are required for the VHF band set 36, VHF/UHF band set 38, and L band set 40 of antenna elements employed in DF system 12. As previously mentioned, the antenna model 42 is required to meet the same physical and electrical requirements as the full-scale antenna 22 employed in DF system 12. The requirements that must be met over the entire intended frequency band of operation include the antenna's voltage standing wave ratio (VSWR), coverage/gain, and physical size, including length, width, and thickness.

Although the elements in the antenna array 22 of the DF system 12 are not so large that their position with respect to a source of RF transmissions could not be manipulated to establish test data for the database 14, the same is not necessarily true with respect to aircraft 20. By frequency-scaling both the antenna model 42 and the aircraft model 44, however, much smaller and more manageable test fixtures can be employed in the collection of data.

To understand the frequency scaling employed, it must first be remembered that the spacing of the elements of the antenna 22 to be modeled is directly proportional to transmission wavelength and inversely proportional to frequency. Thus, by increasing the transmission frequency of signal source system 46 to forty times that of source 16, the size of antenna model 42 can be reduced to 1/40 of the full-scale antenna 22, while still producing correlative data representative of the full-scale system. As a result, the higher frequency phase and amplitude output of antenna model 42 will correlate to the lower frequency outputs of the DF system antenna array 22 under the same conditions.

Addressing the individual components of antenna model 42, when data representative of the performance of the VHF set 36 of full-scale antenna elements is to be collected, a 1/40 scale model of the VHF set 36 is preferably employed. This model is identical to the VHF set 36 of elements, except that it is 1/40 scale and designed to receive RF transmissions over a frequency range of 1200 to 4400 MHz. As will be appreciated, the aircraft model 44 is also 1/40 scale, and will include 1/40 scale models of the VHF/UHF band and L band sets of antenna elements.

Similarly, the component of model 42 used to evaluate the performance of the VHF/UHF band set 38 of DF system antenna elements is a 1/20 scale model of the VHF/UHF band set 38 and is designed to receive RF transmissions in the 2200 to 10,000 MHz range. In this case, the aircraft model 44 will be 1/20 scale and will include 1/20 scale models of the VHF/UHF and L band sets of antenna elements.

Addressing now the aircraft model 44, as will be appreciated, model 44 must be scaled in the same manner as the particular antenna model 42 from which data is to be collected. This scaling not only ensures that the perturbations introduced by the aircraft model 42 will parallel those introduced by aircraft 20, it also makes the modeling process physically more manageable. A full-scale aircraft model would simply be too large for pattern measurement under most circumstances.

As will be appreciated, the aircraft model 44 must parallel the actual aircraft 20 in all respects as nearly as possible. The surface of aircraft model 44 must be conductive to provide a ground plane for the antenna model 42, just as the skin of aircraft 20 provides a ground plane for the full-scale antenna array 22. In accordance with this project, it has been discovered that, for a 1/20 scale aircraft model 44, a silver layer 0.05 to 0.1 millimeter thick covered by an aluminum or copper flame spray 0.13 millimeter thick is suitable. For a 1/40 scale aircraft model 44, the silver layer is preferably 0.08 to 0.1 millimeter thick, while the aluminum or copper flame spray layer is 0.15 millimeter thick.

In addition to providing accurate scaling of the antenna model 42 and aircraft model 44 individually, the relative orientation of antenna model 42 and aircraft model 44 must closely correspond to that of the antenna array 22 and aircraft 20 to ensure proper correlation between measured data and the database data.

Figure 9:
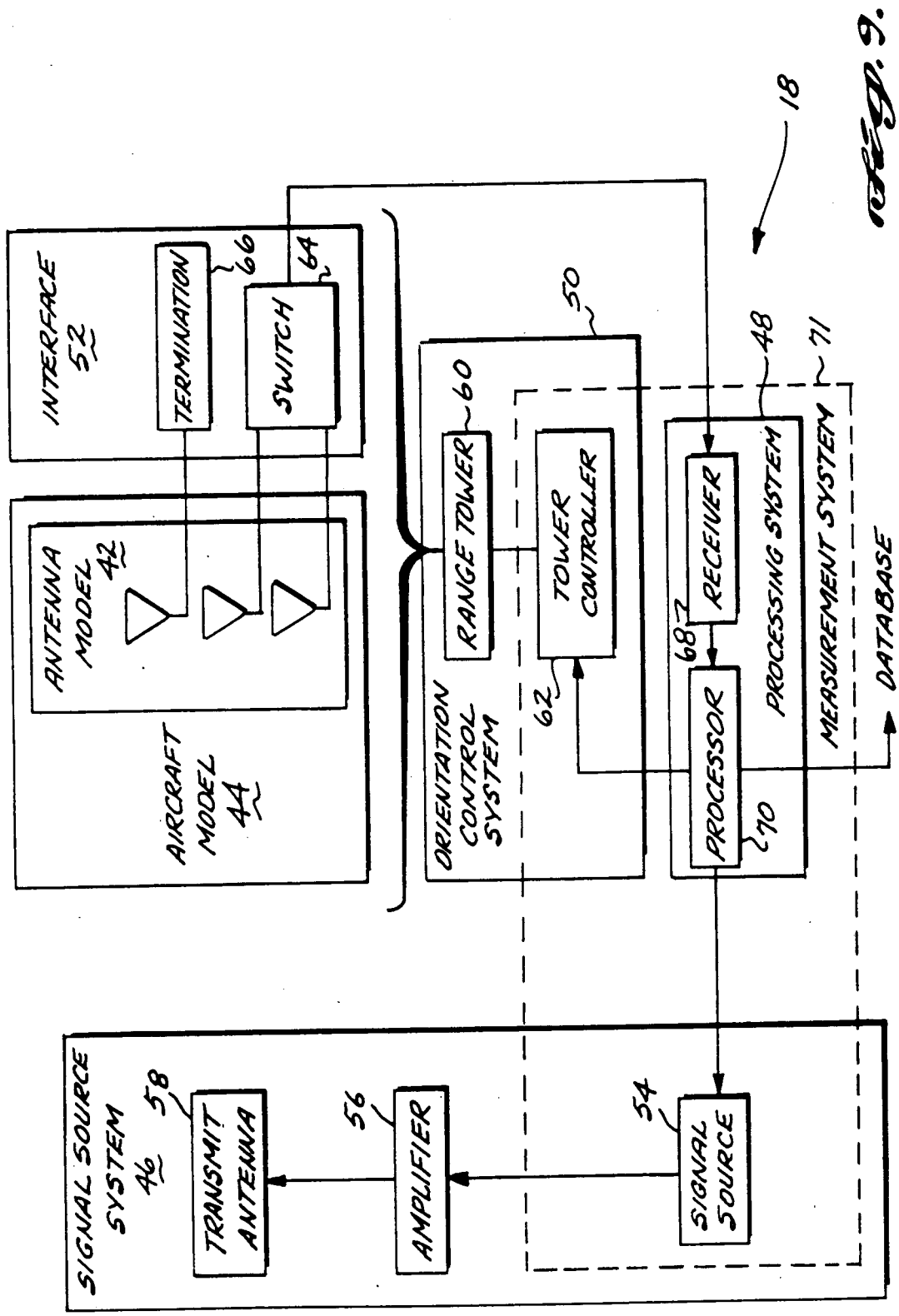
FIG. 9 illustrates a first embodiment of the database production system of FIG. 8.

Addressing now the other components of the database production system 18 in greater detail, two embodiments of the database production system 18 of FIG. 8 will be described. In that regard, the first embodiment is shown in FIG. 9. As shown, the signal source system 46 includes a multiple-frequency signal source 54 for producing RF transmissions at the various selectable, scaled frequencies required to model the overall performance of the DF system antenna array 22. The operation of source 54 is controlled by processing system 48 and its output is amplified by an RF amplifier 56. This amplified output is, in turn, coupled to a transmit antenna 58. The transmit antenna 58 responds by illuminating the antenna model 42 and aircraft model 44 with electromagnetic radiation at the selected frequency.

The orientation control system 50 includes a range tower 60 that supports the antenna model 42 and aircraft model 44 at any one of a plurality of select azimuths and elevations with respect to the transmit antenna 58. The position of range tower 60 is governed by a tower controller 62, in response to a control signal produced by processing system 48. In this manner, the effective azimuth and elevation of the wave applied by transmit antenna 58 to antenna model 42 can be stepped through the desired ranges as data is taken.

As shown in FIG. 9, the processing system 48 receives the output of antenna model 42 via the interface 52. In the embodiment shown, only two elements of the antenna model 42 are monitored at a given time. In that regard, a switch 64 is coupled to the two elements to be monitored and a 50-ohm termination 66 is connected to the other element. Switch 64 is operable in a manner described in greater detail below to couple the two antenna elements monitored to a receiver 68 in the processing system 48.

In the arrangement shown, receiver 68 is a single-channel device that produces outputs representative of the amplitude of the signals received from the two antenna elements as well as the phase difference therebetween. A processor 70 included in processing system 48 converts this amplitude and phase information into the complex voltages stored as database 14 in a manner to be described in greater detail below. The processor 70 also provides control outputs to the signal source 54 and tower controller 62 to regulate the apparent frequency, azimuth, and elevation of the data output by processor 70 to database 14.

Although described as individual components, the signal source 54, tower controller 62, receiver 68, and processor 70 are preferably all elements of a single measurement system 71. In the preferred arrangement, system 71 is the 2080 antenna measurement system sold by Scientific Atlanta of Atlanta, Ga.

Figure 10:
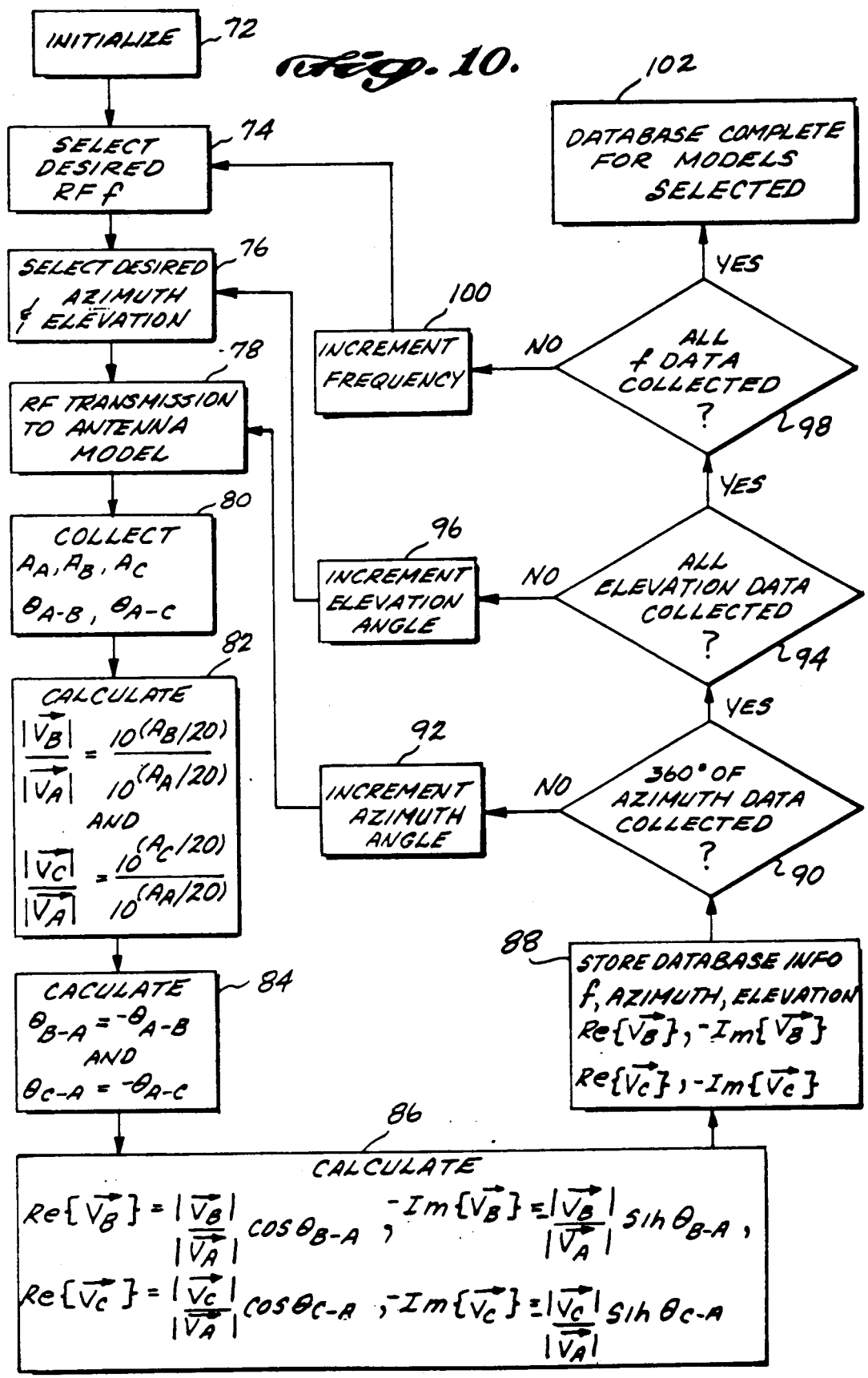
FIG. 10 is a flow chart illustrating the development of a database by the system shown in FIG. 9.

Addressing now the operation of the database production system 18 of FIG. 9 in greater detail, reference is had to FIG. 10. FIG. 10 illustrates the operation of the database production system 18 as a sequence of steps. First, in block 72, various aspects of the system, such as antenna range, are initialized. Next, the desired operating frequency of signal source 54 is determined by processor 70, at block 74. The processor 70 then provides a control signal to the orientation control system 50 at block 74 to adjust the position of antenna model 42 relative to transmit antenna 58. As a result, RF transmissions from antenna 58 to the antenna model 42 will have a select known azimuth and elevation. At block 78, processor 70 actually causes signal source system 58 to transmit RF radiation having the desired frequency, azimuth, and elevation to antenna model 42.

Next, at block 80, the receiver 68 receives the voltages produced by antenna model 42 in response to the RF transmission and produces five outputs in response: the amplitude ($A_A$) of the signal at antenna element A, the amplitude ($A_B$) of the signal at antenna element B, the phase difference ($\theta_{A-B}$) between the signals at antenna elements A and B, the amplitude ($A_C$) of the signal at antenna element C, and the phase difference ($\theta_{A-C}$) between the signals at antenna elements A and C.

As will be appreciated, these outputs are collected with the aid of switch element 64, which allows one channel of the receiver to be switched back and forth between two antenna elements. After each switching, the receiver 68 measures both the phase and amplitude of the signal produced by the antenna element. The phase difference is then calculated by taking the difference between the two phase measurements for each channel.

As will be appreciated, if only a single-channel receiver 68 is available, as shown in FIG. 9, step 80 must be performed separately for each pair of antenna elements, requiring switch 64 and termination 60 to be reconnected. If, on the other hand, a multiple-channel receiver 68 is employed, all of these measurements can be obtained without operator intervention or additional switching at interface 52.

The next step performed by the database production system 18 is at block 82, where the first step toward converting the data output by receiver 68 to a complex voltage format is taken. More particularly, the processor 70 processes the output of receiver 68 to calculate two quantities in accordance with equations (1) and (2) below.

$$\frac{|\vec{V}_B|}{|\vec{V}_A|} = \frac{10^{(AB/20)}}{10^{(AA/20)}} \quad (1)$$

$$\frac{|\vec{V}_C|}{|\vec{V}_A|} = \frac{10^{(AC/20)}}{10^{(AA/20)}} \quad (2)$$

wherein $|\vec{V}_A|$, $|\vec{V}_B|$, and $|\vec{V}_C|$ are the magnitudes of the complex voltages at antenna elements A, B, and C, respectively. As will be appreciated, the computations performed in accordance with equations (2) and (3) effectively normalize the outputs of antenna elements B and C with respect to the output of element A.

Next, at block 84, processor 70 determines the negatives $-\theta_{A-B}$ and $-\theta_{A-C}$ of the phase differences measured at block 80. The real and imaginary components of the complex voltages $\vec{V}_B$ and $\vec{V}_C$ output by antenna elements B and C, are determined by processor 70 at block 86 in accordance with equations (3) through (6) below:

$$Re\{\vec{V}_B\} = \frac{|\vec{V}_B|}{|\vec{V}_A|} \cos\theta_{B-A} \quad (3)$$

$$-Im\{\vec{V}_B\} = -\frac{|\vec{V}_B|}{|\vec{V}_A|} \sin\theta_{B-A} \quad (4)$$

$$Re\{\vec{V}_C\} = \frac{|\vec{V}_C|}{|\vec{V}_A|} \cos\theta_{C-A} \quad (5)$$

$$-Im\{\vec{V}_C\} = -\frac{|\vec{V}_C|}{|\vec{V}_A|} \sin\theta_{C-A} \quad (6)$$

Thus, block 86 produces the complex voltage information that is to be stored in database 14 for the particular element set, transmission frequency, azimuth, and elevation selected by processor 70. This data, which is also influenced by the perturbations introduced by aircraft model 44, is stored in memory at block 88 for inclusion in the database 14.

With one data point having been obtained, the database production system 18 must now repeat this process for each of the other data points to be taken. To that end, the processor 70, at block 90, determines whether 360 degrees of azimuth data have been collected. If it has not, the processor 70 will provide an output to tower controller 62, causing range tower 60 to rotate the antenna model 42 relative to transmit antenna 58. In this manner the azimuth angle is incremented by, for example, two degrees. Then, as shown in FIG. 10, processor 70 repeats steps 78 through 88 for this new combination of azimuth, frequency, and elevation. Finally when 360 degrees of azimuth data have been collected for the particular frequency and elevation employed, the operation of processor 70 is advanced from block 90 to block 94.

The processor 70, at block 94, next determines whether data has been obtained over the desired elevation range. If processor 70 determines that it has not, an output is provided to tower controller 60, causing the position of range tower 60 and antenna model 42 relative to the transmit antenna 58 to be incremented. As a result, elevation is incremented and program flow is restored to block 76 and processor 70 repeats the operations shown in blocks 76 through 94 until data is collected for the desired range of elevation for the same frequency, and for 360 degrees of azimuth.

Once processor 70 determines that all the required azimuth and elevation data for a given frequency have been produced, the operation of processor 70 is advanced from block 94 to block 98, where processor 70 determines whether data has been obtained for each desired frequency. If the desired data has not been obtained, processor 70 causes the frequency output by the signal source 54 to be incremented at block 100 and the entire process represented by blocks 74 through 98 is repeated until all of the desired frequency, elevation, and azimuth data are collected. At this point, represented by block 102 in FIG. 10, the database 14 is complete for the model 42 of the antenna set being evaluated. As will be appreciated, this process is then repeated for any other antenna models that are to be tested.

As will be appreciated, any desired increments in the azimuth, elevation, and frequency data can be implemented by processor 70 at blocks 92, 96, and 100. By using smaller increments, more data is collected, allowing DF system 12 to operate more accurately without interpolation. The additional data, however, requires greater storage capacity for database 14. In the preferred embodiment, azimuth increments of two degrees, elevational increments of 5.0 degrees, and frequency increments of from one to ten megahertz are employed.

Figure 11:
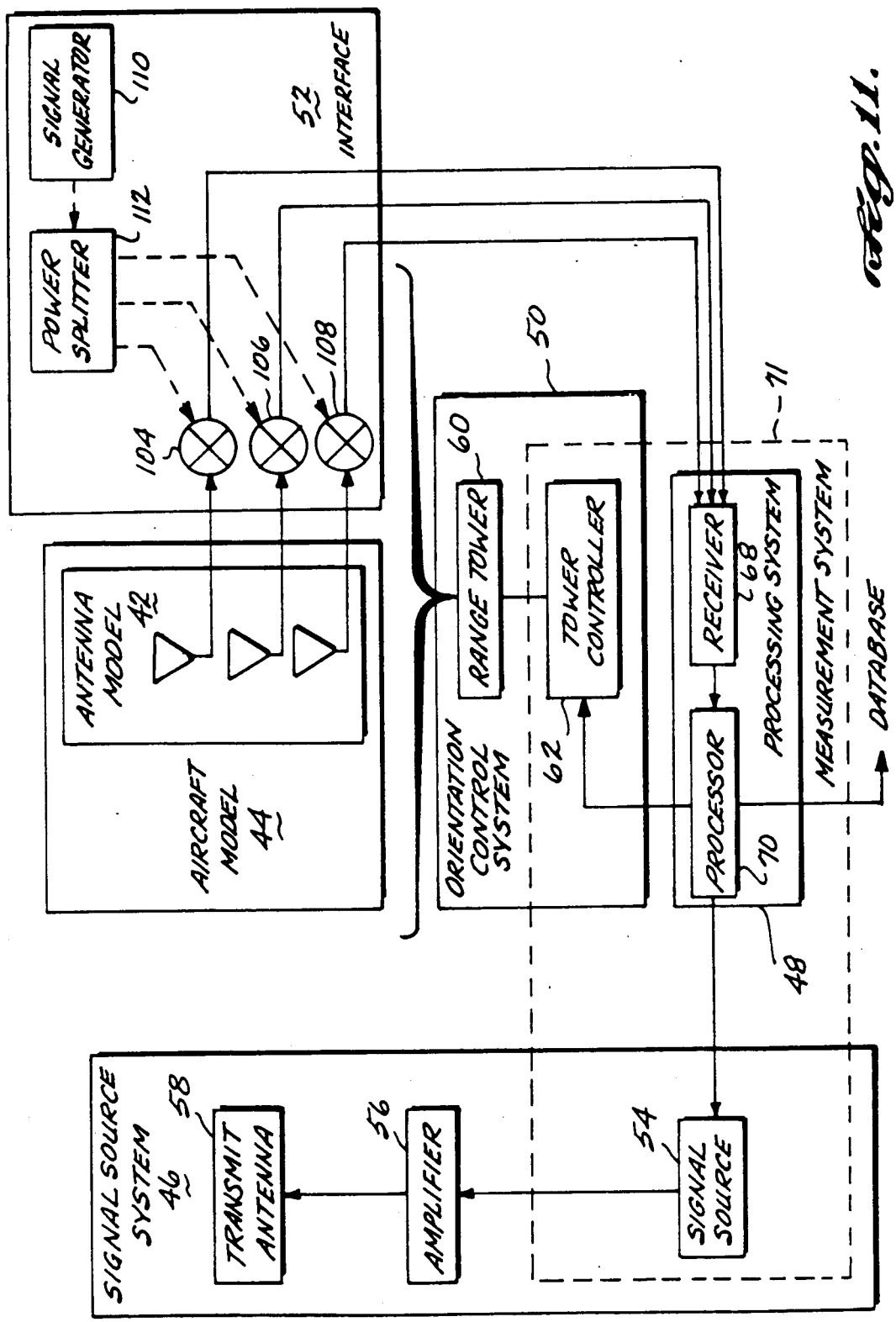
FIG. 11 illustrates a second embodiment of the database production system of FIG. 8.

Turning now to a discussion of the second embodiment of the database production system 18, reference is had to FIG. 11. As will be appreciated, this embodiment is similar to that shown in FIG. 9 and, for that reason, like components are designated with like reference numbers. The two distinctions of interest concern the interface 52 and the receiver 68.

More particularly, the receiver 68 is now identical to the receiver 24 that is included in the DF system 12. As a result, the real and imaginary components of the perturbed complex voltages to be stored in database 14 for correlation to the outputs of DF system 12 are produced directly by receiver 68.

Because the outputs of the antenna model 42 are at a relatively high, scaled frequency, however, a frequency down conversion is required. In that regard, the interface 52 includes mixers 104, 106, and 108 coupled to each element of the antenna model 42. A signal generator 110 and power splitter 112 cooperatively provide the mixing frequency signal required to effect the desired down conversion to mixers 104, 106, and 108. As a result, mixers 104, 106, and 108 combine their inputs to provide outputs to receiver 68 at the same frequencies employed in DF system 12.

Figure 12:
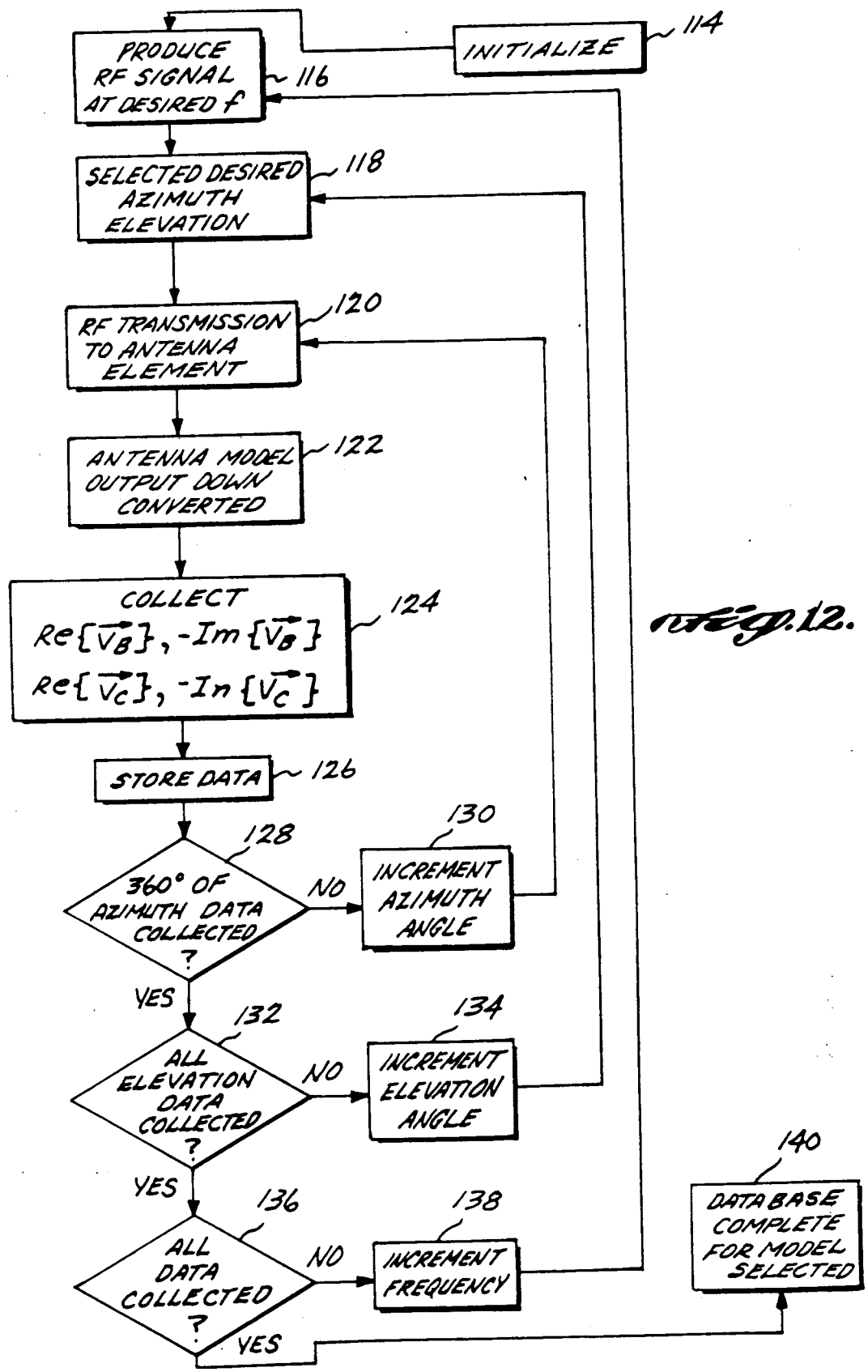
FIG. 12 is a flow chart illustrating the development of a database by the system shown in FIG. 11.

As will be appreciated, like the system of FIG. 9, the processor 70 regulates the signal source 54 and tower controller 62 to ensure that data is collected for the desired range of frequencies, azimuths, and elevations. In that regard, the operation of the embodiment of system 18 shown in FIG. 11 will now be described in greater detail in connection with FIG. 12.

As shown, the processor 70 is initialized at block 114 for proper operation. The processor 70 then sends a control signal to the signal source 54 at block 116 to select the first of a plurality of select frequencies at which data is to be collected. Next, processor 70 sends a control signal to tower controller 62 to adjust the position of range tower 60, ensuring that the RF transmissions from transmit antenna 58 are received by the antenna model 42 at the desired azimuth and elevation at block 118. Finally, at block 120, the processor 70 causes the signal source 54, amplifier 56, and transmit antenna 58 to cooperatively provide the desired RF transmission to the antenna model 42.

As previously noted, the outputs of the antenna model 42 are at the relatively high, scaled frequencies. At block 122, the mixers 104, 106, and 108, power splitter 110, and signal generator 112 cooperatively down convert the output of the antenna model 42 before application of the conventional threechannel coherent receiver 68 of the type included in the DF system 12. The processing system 48 produces an output at block 124, which includes the real component $Re\{\vec{V}_B\}$ of the complex voltage at antenna element B, the real component $Re\{\vec{V}_C\}$ of the complex voltage at antenna element C, and the negative of the imaginary components $-Im\{\vec{V}_B\}$, $-Im\{\vec{V}_C\}$ of the two complex voltages. These four values are then stored by processor 70 in connection with the appropriate antenna set, frequency, azimuth, and elevation at block 126.

Next, a sequence of operations is performed to ensure that all of the data required for the database 14 has been collected. In that regard, as shown at block 128, the processor 70 first determines whether 360 degrees of azimuth data have been collected. If not, the processor 70 sends a control signal to the tower controller 62 to adjust the position of range tower 60 and antenna model 42 and, hence, increment the azimuth angle of the RF transmissions received by antenna model 42, as shown at block 130. Processor 70 then repeats the process described in connection with steps 120 through 128, collecting 360 degrees of azimuth data for the particular frequency and elevation involved.

Once 360 degrees of azimuth data have been collected, the processor 70 determines whether data has been collected at all the desired elevational increments, at block 132. If it has not, processor 70 sends a control signal to tower controller 62 to initiate the desired change in the position of range tower 60 and the elevational angle of the received RF transmissions, at block 134. The processor 70 then initiates a repetition of the steps 118 through 132 described above to complete the collection of data for the various elevational increments of the frequency selected.

Once this elevational data has been collected, processor 70 determines at block 136 whether data has been collected for each of the frequencies of interest. If it has not, the processor 70 sends a control signal to signal source 54 to initiate an increment in the frequency of the RF transmissions produced by transmit antenna 58 at block 138. At this point, the processor 70 then repeats steps 116 through 136 above to collect all of the desired azimuth and elevational data for these frequencies.

Finally, when data has been collected and stored for all the various combinations of azimuth, elevation, and frequency, the processor 70 of block 140 indicates that database 14 is complete for the particular antenna model 42 analyzed. The system operator then positions any additional antenna models 42 that are to be tested on range tower 60 and repeats the entire process.

Figure 13:
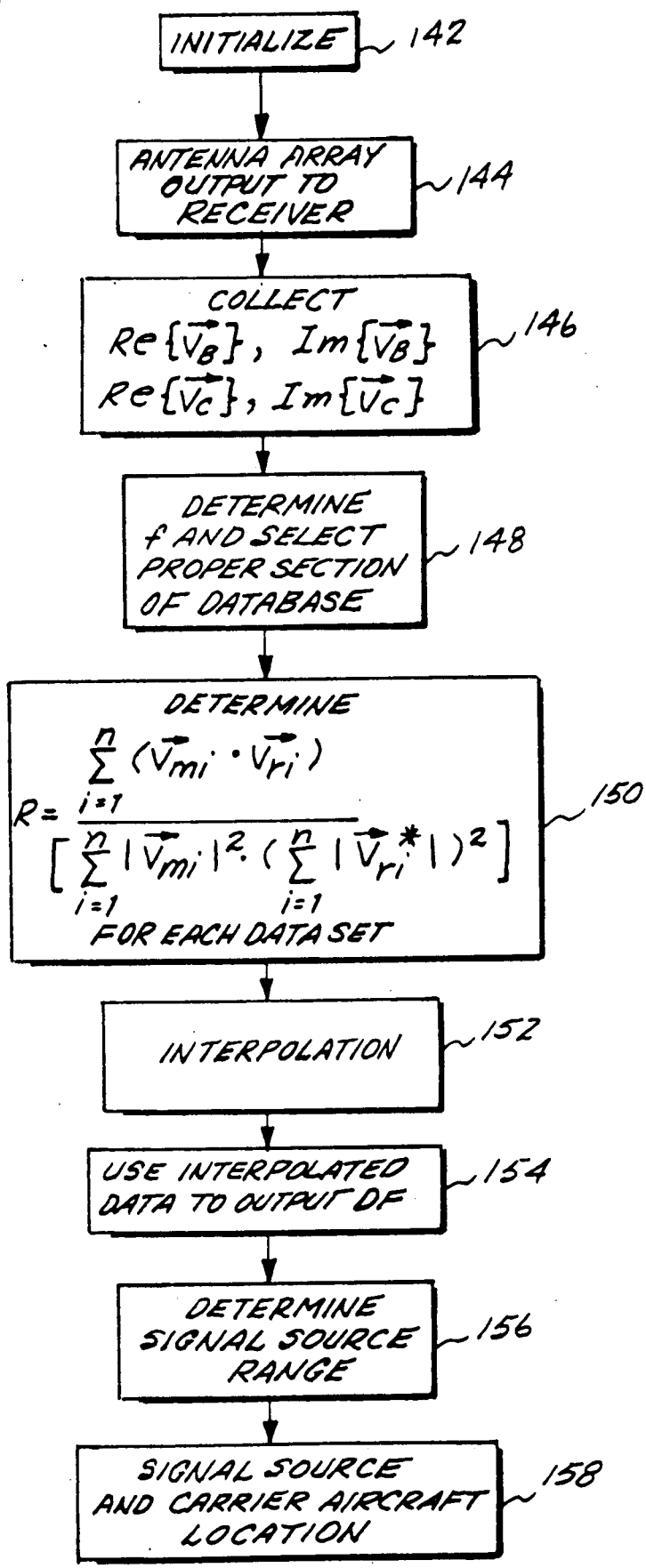
FIG. 13 is a flow chart illustrating the use of a database by the DF system of FIG. 2.

Having reviewed the manner in which the database 14 is collected, its use in the DF system 12 of FIG. 2 will now be considered in greater detail. More particularly, the overall operation of DF system 12 is illustrated in flow chart form in FIG. 13. As represented by block 142, the correlation processor 26 and system processor 30 are first initialized with the various parameters required for subsequent proper operation. Next, at block 144, an RF transmission is received by one of the various sets of antenna elements included in antenna array 22 and the output of antenna array 22 is applied to receiver 24. The receiver 24 responds by producing a set of complex voltages for storage as the real component Re $\{\vec{V}_B\}$ of the complex voltage at antenna element B, the imaginary component Im $\{\vec{V}_B\}$ of the complex antenna voltage at element B, the real component Re $\{\vec{V}_C\}$ of the complex voltage at antenna element C, and the imaginary component Im $\{\vec{V}_C\}$ of the complex voltage at antenna element C. As will be appreciated, each of these voltages is effectively normalized to the voltage produced at antenna element A by receiver 24.

The next step performed by correlation processor 26, at block 148, is to identify the particular set 36, 38, or 40 of antenna elements that received the transmission, as well as the frequency of the RF transmission received by the elements. This allows correlation processor 26 to identify the portion of database 14 that includes the appropriate data, at block 148. If none of the database frequencies corresponds identically to the received frequency, the correlation processor 26 may be programmed to select the closest set of data or perform a linear or Lagrange interpolation between sets of data.

Next, the correlation processor 26 correlates the measured voltages to the stored database voltages at the frequency of interest. As shown at block 150, the correlation coefficient R associated with each measured voltage $\vec{V}_{mi}$ and stored voltage $\vec{V}_{ri}$ pair is thus determined in accordance with equation 7, as follows:

$$R = \frac{\sum_{i=1}^{n} (\vec{V}_{mi} \cdot \vec{V}_{ri}^*)}{\left[ \sum_{i=i}^{n} |\vec{V}_{mi}|^2 \cdot \left( \sum_{i=i}^{n} |\vec{V}_{ri}^*| \right) \right]} \quad (7)$$

where n is the number of antenna elements and $\vec{V}_{ri}^*$ is the complex conjugate of $\vec{V}_{ri}$.

At this point, system processor 30 could simply identify the data having the highest correlation coefficient and identify the azimuth and elevation associated with that data as the true azimuth and elevation of the RF transmission received by array 22, corrected for the environmental perturbations induced by aircraft 20. Because a finite amount of data has been collected in the database 14, however, it is unlikely that the data having the resultant highest correlation coefficient will precisely indicate the true azimuth and elevation of signal source 16. More likely, the true azimuth and elevation lie somewhere between those corresponding to the data point having the highest correlation coefficient, along with those points one azimuth step above and one azimuth step below. As a result, some form of interpolation by processor 26 may preferably be employed at block 152 such as parabolic curve fitting.

As will be appreciated, the system processor 30 may also be instructed to obtain data from correlation processor 26 to determine the range of the signal source 16 as indicated at block 156. In that regard, although the passive ranging provided is somewhat coarse, phase plots measured at a plurality of elevation angles about 90 degrees (near the horizon) for antennas A-B, B-C, and A-C will have approximately the same phase signature but will exhibit slightly different magnitudes in the phase signature. These different magnitude levels for corresponding azimuth angles can be stored in the processor 30 for recognition when recurring during flight. The signal sources' range is then equal to aircraft altitude, available from inertial navigation system 32, divided by $\sin^{-1}\theta - 90$.

Finally, at block 158, the system processor 30, by consulting correlation processor 26 and INS 32 is able to identify the location of the signal source 16 and the carrier aircraft 20.

As will be appreciated, the system described above has a number of advantages. For example, it is suitable for use in the high-speed acquisition and processing of data in a wide variety of applications including CO-MINT and SRS direction finding. Because a relatively low number of antennas can be used to provide highly accurate information, uninfluenced by environmental perturbations, the system is adaptable to a wide variety of site configurations. Further, postcalibration is not required, making the system immediately available for use on an aircraft, providing ease and efficiency of operator interactions.

Those skilled in the art will recognize that the embodiments of the invention disclosed herein are exemplary in nature and that various changes can be made therein without departing from the scope and the spirit of the invention. In this regard, and as was previously mentioned, the invention was readily embodied with three-, four-, or five-element antenna arrays. Further, it will be recognized that a variety of different algorithms can be employed for correlation and curve fitting. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A system for receiving electromagnetic radiation, which may be subject to environmental perturbations, and producing a system output that is substantially unaffected by the perturbations, said system comprising:
   antenna means for producing an antenna output in response to received electromagnetic radiation that may be affected by the perturbations;
   data storage means for storing information relating to the effect of the perturbations on electromagnetic radiation received by said antenna means, the information being based upon a frequency-scaled analysis of the performance of said antenna means; and
   processing means for receiving the antenna output from said antenna means and information from said data storage means to produce the system output.

2. The antenna system of claim 1, wherein said system is for use on an aircraft and the environmental perturbation are caused by the aircraft.

3. The antenna system of claim 2, wherein the system output is indicative of the direction of a source of the electromagnetic radiation.

4. The antenna system of claim 3, wherein said antenna means comprises an array of no more than five antennas.

5. The antenna system of claim 4, wherein the information based upon a frequency-scaled analysis includes information obtained for electromagnetic radiation received at a plurality of frequencies and a plurality of azimuth and elevation angles with respect to said antenna means.

6. A direction-finding system positionable on an aircraft, for finding the direction of a source of incoming electromagnetic radiation of variable frequency, the aircraft perturbing the phase and amplitude of the electromagnetic radiation, said system comprising:
   an array of three antenna elements, said antenna elements being spaced by distances of no more than one-half the wavelength of the highest frequency of the electromagnetic radiation, said array of antenna elements producing a plurality of antenna outputs in response to incoming electromagnetic radiation; and
   correlation means for correlating said plurality of antenna outputs to representative data, said representative data being empirically derived at a plurality of scaled electromagnetic radiation frequencies and including information about the azimuth and elevation angle of the scaled electromagnetic radiation and the perturbations of the aircraft.

7. A database constructed with the aid of a frequency-scaled test antenna model that may receive electromagnetic radiation, said database being for use by a processing system in reducing the effect of amplitude and phase perturbation on electromagnetic radiation received by a system antenna from a source, said database comprising:
   phase data for a plurality of known frequencies of electromagnetic radiation received by the frequency-scaled test antenna model at a plurality of known azimuth and elevation angles; and
   amplitude data for a plurality of known frequencies of electromagnetic radiation received by the frequency-scaled test antenna model at a plurality of known azimuth and elevation angles.

8. The database of claim 7, wherein the scale between the plurality of known frequencies of electromagnetic radiation received by the antenna model and the frequencies of electromagnetic radiation to be received by the system antenna is proportional to the physical scale between the antenna model and the system antenna.

9. The database of claim 8, wherein said antenna model produces outputs at the plurality of known frequencies of electromagnetic radiation received by the antenna model and wherein said phase data and said amplitude data are produced by the processing system in response to the outputs produced by said antenna model after the known frequencies are scaled to the frequencies of electromagnetic radiation to be received by the system antenna.

10. A method of creating a correlation database for use in correlating the output of a system antenna, produced in response to received electromagnetic radiation, with the output of a frequency-scaled model antenna, produced in response to received electromagnetic radiation at a scaled frequency, said method comprising the steps of:
   providing electromagnetic radiation to the model antenna at a plurality of scaled frequencies and azimuth and elevation angles; and
   processing the outputs of the model antenna at the plurality of scaled frequencies and azimuth and elevation angles to produce phase and amplitude data that includes perturbations characteristic of both the model antenna and system antenna environments.

11. The method of claim 10, wherein the step of processing the outputs of the model antenna further comprises the steps of:
   scaling the frequency of the outputs of the model antenna to correspond to the frequency of the electromagnetic radiation to be received by the system antenna; and
   using a receiver designed for use with the system antenna to produce the phase and amplitude data.

12. A method of direction finding employing a correlation database, including data indicative of azimuth and elevation, to correct the output of an antenna, produced in response to received electromagnetic radiation, for perturbations caused by the antenna's environment, said method comprising the steps of:
   identifying a first section of the database applicable to the received electromagnetic radiation based upon the frequency of the received electromagnetic radiation;
   identifying a second section of the database, included in the first section, that most nearly correlates to the response produced by the antenna; and
   determining the azimuth and elevation of the received electromagnetic radiation, substantially unaffected by the perturbation caused by the antenna environment, by determining the azimuth and elevation associated with said second section of the database.

* * * * *

UNITED STATES PATENT AND TRADEMARK OFFICE
CERTIFICATE OF CORRECTION

PATENT NO. : 5,039,991
DATED : August 13, 1991
INVENTOR(S) : O. A. Boese et al.

It is certified that error appears in the above-identified patent and that said Letters Patent is hereby corrected as shown below:

| COLUMN | LINE | |
|---|---|---|
| 2 | 32 | "preformance" should be --performance-- |
| 5 | 26 | "onehalf" should be --one-half-- |
| 6 | 32 | after "amplitude" delete "an" and insert therefor --and-- |
| 12 | 58 | after "application" delete "of" and insert therefor --to-- |
| 12 | 58 | "threechannel" should be --three-channel-- |
| 14 (Equation 7) | 13 | "$\sum_{i=1}^{n}$" should be --$\sum_{i=i}^{n}$-- |
| 14 | 65 | "postcalibration" should be --post-calibration-- |
| [57] | 5 | "transmission" should be --transmissions-- |

Signed and Sealed this

Twenty-seventh Day of April, 1993

Attest:

MICHAEL K. KIRK

*Attesting Officer*　　　*Acting Commissioner of Patents and Trademarks*